United States Patent
Ball et al.

(10) Patent No.: US 10,774,951 B2
(45) Date of Patent: Sep. 15, 2020

(54) PIPE SUPPORT SYSTEM AND METHOD

(71) Applicant: WCM Industries, Inc., Colorado Springs, CO (US)

(72) Inventors: William T. Ball, Colorado Springs, CO (US); Eric Pilarczyk, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 0 days.

(21) Appl. No.: 16/191,233

(22) Filed: Nov. 14, 2018

(65) Prior Publication Data
US 2019/0145547 A1 May 16, 2019

Related U.S. Application Data

(60) Provisional application No. 62/586,983, filed on Nov. 16, 2017.

(51) Int. Cl.
*F16L 3/02* (2006.01)
*F16L 3/18* (2006.01)
*F16L 3/10* (2006.01)
*F16L 3/127* (2006.01)

(52) U.S. Cl.
CPC .............. *F16L 3/02* (2013.01); *F16L 3/1058* (2013.01); *F16L 3/127* (2013.01); *F16L 3/18* (2013.01)

(58) Field of Classification Search
CPC . F16L 3/02; F16L 3/1058; F16L 3/127; F16L 51/00; F16L 3/18; F16L 3/16; B66F 5/025; E04G 25/04; E04F 15/0247; F16M 11/046; F16B 1/00
See application file for complete search history.

(56) References Cited

U.S. PATENT DOCUMENTS

| | | | | |
|---|---|---|---|---|
| 1,343,279 | A | * 6/1920 | Reynolds | F16L 3/00 248/49 |
| 2,103,811 | A | * 12/1937 | Davis | F16L 3/18 248/55 |
| 2,384,369 | A | 9/1945 | D'Alelie | |
| 2,461,394 | A | 2/1949 | Plante | |
| 3,398,933 | A | * 8/1968 | Haroldson | E04F 15/0247 254/98 |

(Continued)

OTHER PUBLICATIONS

Roof Top Blox, "Adjustable Piping Support" Catalog, Sep. 2013, 2 pgs.

(Continued)

*Primary Examiner* — Christopher Garft

(57) ABSTRACT

A pipe support system includes a base having a collar, and an extension assembly that includes a threaded member having a first end and a second end. The first end has a leg configured to be received by the collar such that the extension assembly is supported by the base, and the second end has a tube with exterior threads. The extension assembly also includes a nut member having corresponding interior threads. The pipe support system also includes a support having an arm configured to be received within the tube and a head extending from one end of the arm. The support rests on the nut member such that upon rotation of the nut member, the head either raises or lowers with respect to the base.

18 Claims, 12 Drawing Sheets

(56) References Cited

U.S. PATENT DOCUMENTS

| | | | | |
|---|---|---|---|---|
| 3,809,348 | A | * | 5/1974 | Di Laura ................ F16L 3/00 248/49 |
| 4,445,656 | A | * | 5/1984 | Leitch ................ F16L 3/1058 24/23 R |
| 4,502,653 | A | * | 3/1985 | Curtis, Jr. ................ F16L 3/18 248/55 |
| 5,110,073 | A | * | 5/1992 | Schoenky ................ F16L 3/02 248/49 |
| 5,435,411 | A | * | 7/1995 | Borgatti ................ B23D 47/025 144/287 |
| 5,906,341 | A | * | 5/1999 | Brown ................ F16L 3/227 248/49 |
| 6,206,613 | B1 | * | 3/2001 | Elkins ................ F16L 3/02 405/157 |
| 6,405,981 | B1 | * | 6/2002 | Hung-Jang ............ F16C 13/00 242/599.3 |
| 7,621,486 | B1 | * | 11/2009 | Barrepski ................ F16L 3/127 248/228.7 |
| 7,673,917 | B2 | | 3/2010 | Oliason |
| 8,033,024 | B2 | | 10/2011 | Goop |
| 8,052,110 | B2 | * | 11/2011 | Wang ................ E04G 25/06 248/354.3 |
| 8,348,317 | B1 | | 1/2013 | Bird |
| 2002/0011548 | A1 | * | 1/2002 | Parker ................ F16L 3/1016 248/354.3 |
| 2013/0214101 | A1 | * | 8/2013 | Daniel ................ F16L 3/02 248/75 |
| 2016/0131280 | A1 | * | 5/2016 | Brown ................ F16L 3/00 29/525.11 |
| 2019/0145548 | A1 | | 5/2019 | Ball |

OTHER PUBLICATIONS

Pipe Prop, "Adjustable Rooftop Pipe Support System" Brochure, Oct. 2017, 2 pgs.

Miro Industries, Inc., "Rooftop Support Products", www.miroind.com/products/, downloaded Aug. 2019, known as of Oct. 2017, 4 pgs.

Eaton, "DURA-BLOK B-Line Series—A Complete Rooftop Support Solution", Jun. 2018, 8 pgs.

MIFAB C-Port, "C-Port Rubber Supports List Price Guide", 2012, 20 pgs.

PHP Systems/Designs, "Product Spotlight: Equipment & Solar Supports, Duct & Cable Trays" Product Flyer, downloaded Aug. 2019, known as of Oct. 2017, 4 pgs.

OMG Roofing products, "Pipe Supports and Flashings", www.omgroofing.com/pipe-supports.html?language=en, 2016, 1 pg.

PortalsPlus, "Pipe Mountings Pedestals", www.portalsplus.com, Oct. 2017, 1 pg.

Big Foot Systems, "Rooftop Building Services Support Systems" Catalog, Mar. 2018, 18 pgs.

Haydon, "H-Block Rooftop Support Systems" Catalog, Jan. 2016, 28 pgs.

U.S. Appl. No. 16/191,215, Office Action dated Jan. 7, 2020, 9 pages.

U.S. Appl. No. 16/191,215, Notice of Allowance dated Apr. 15, 2020, 11 pages.

* cited by examiner

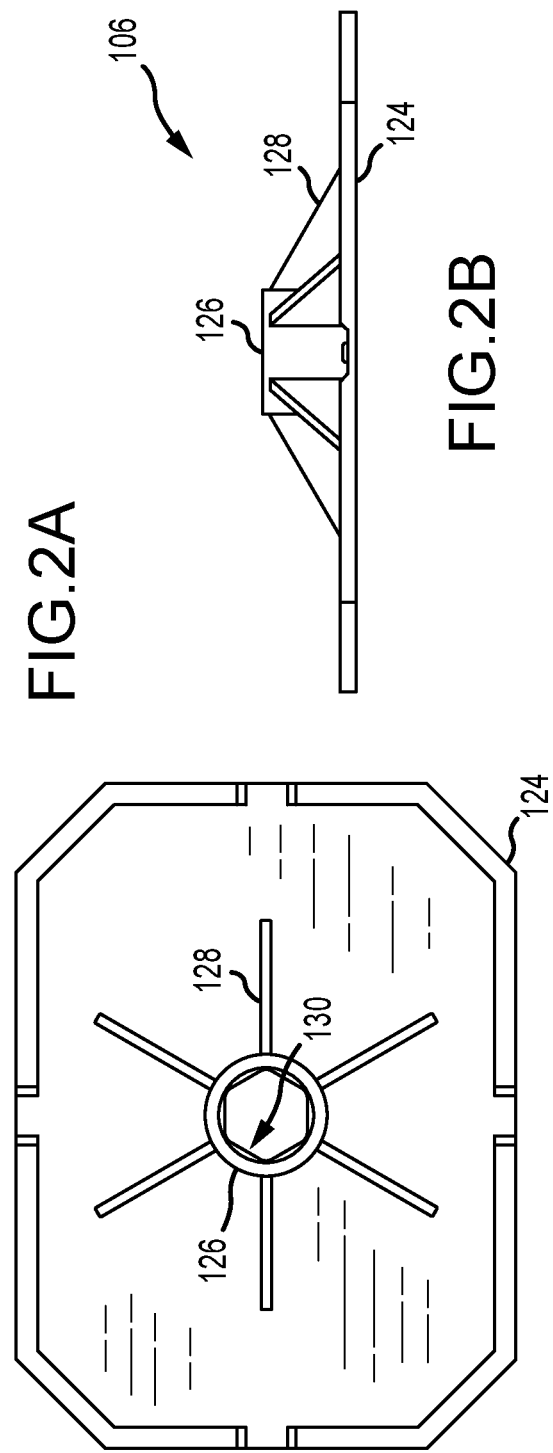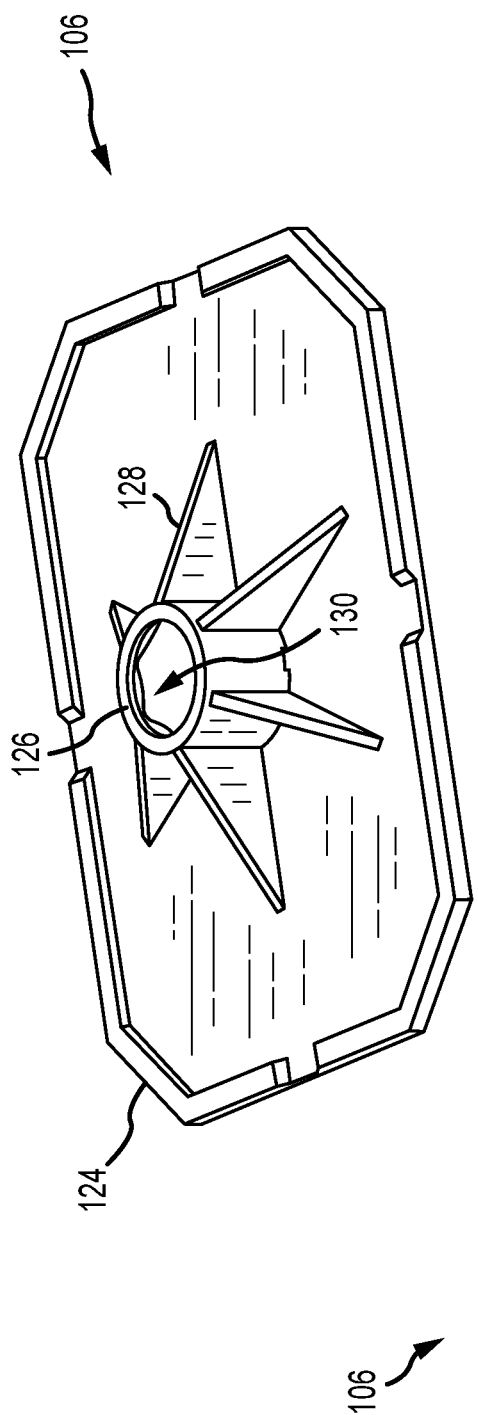

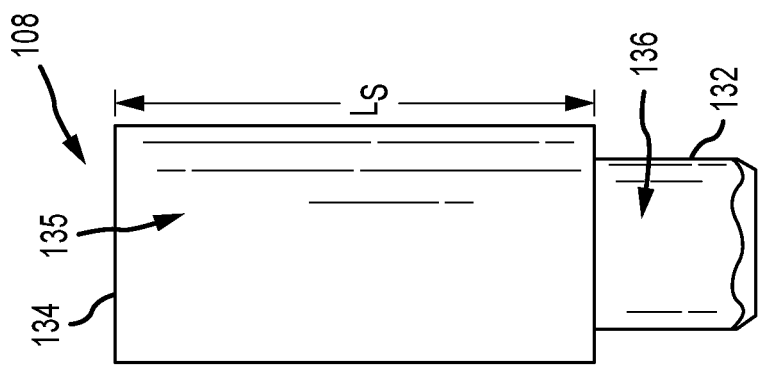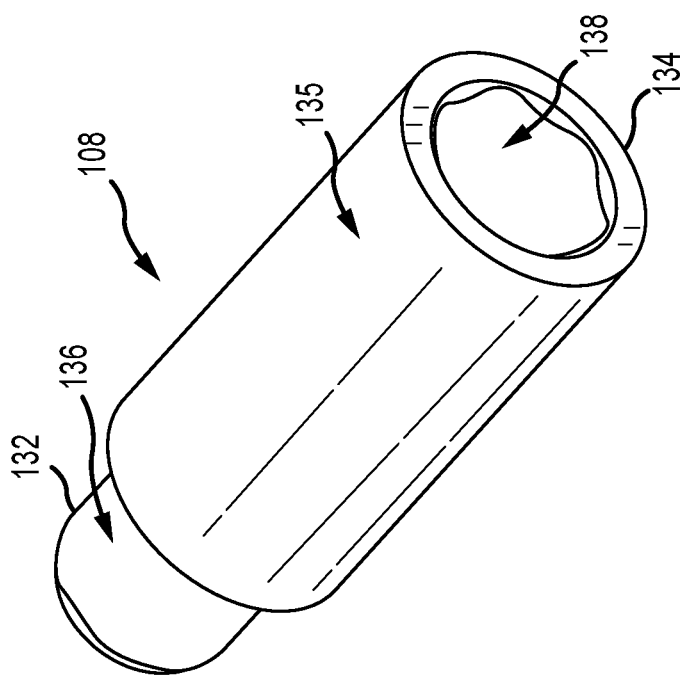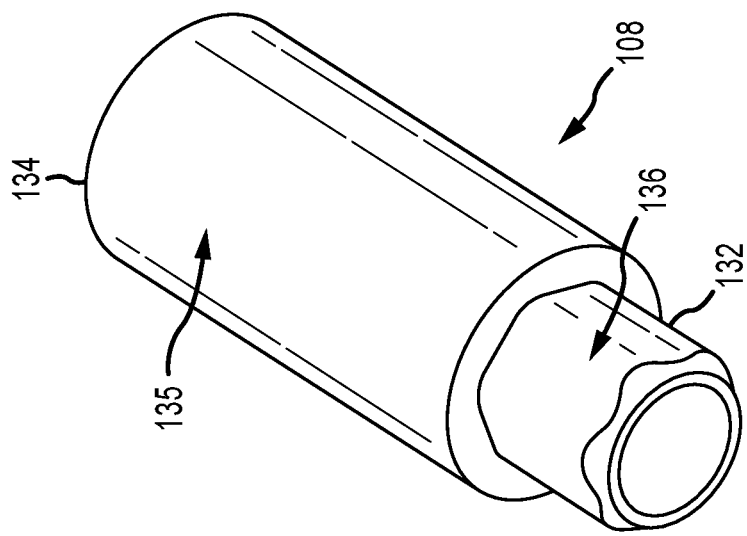

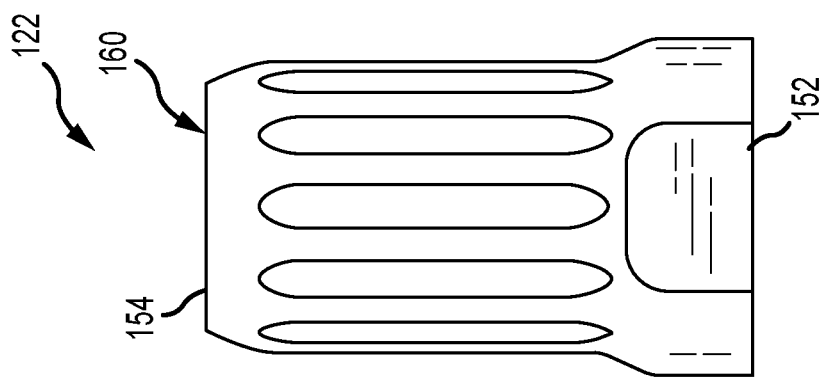
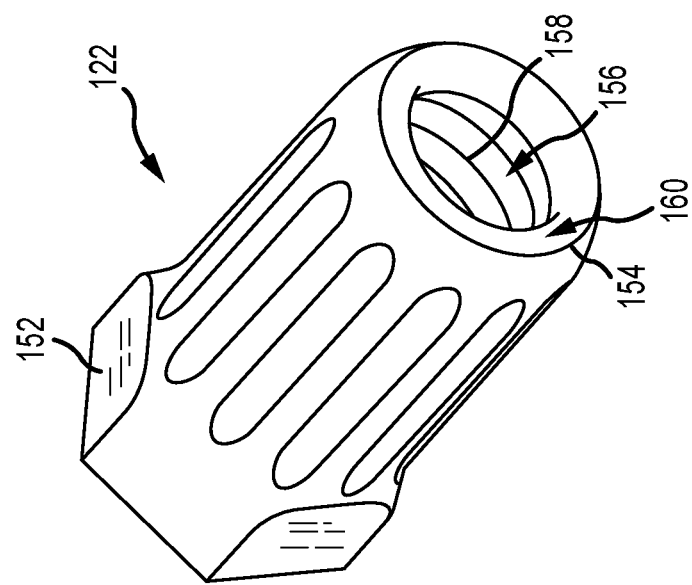
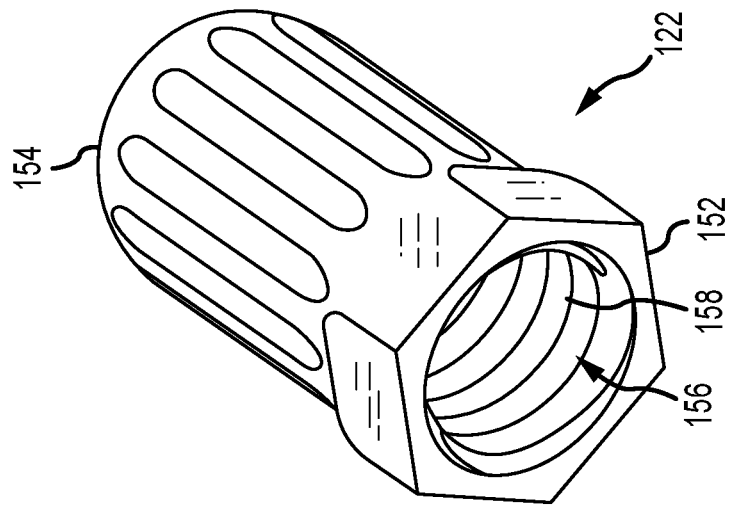

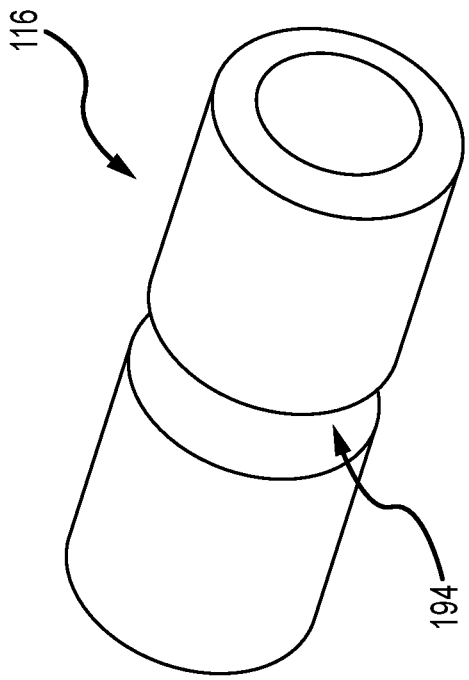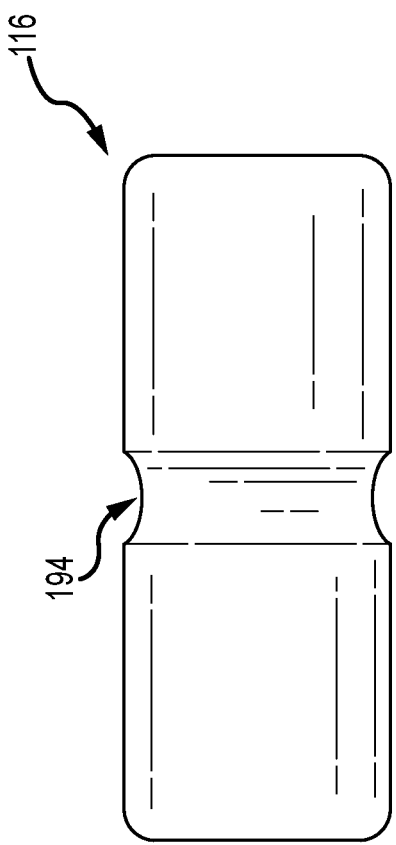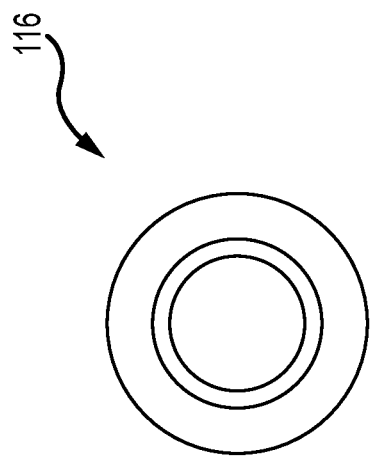

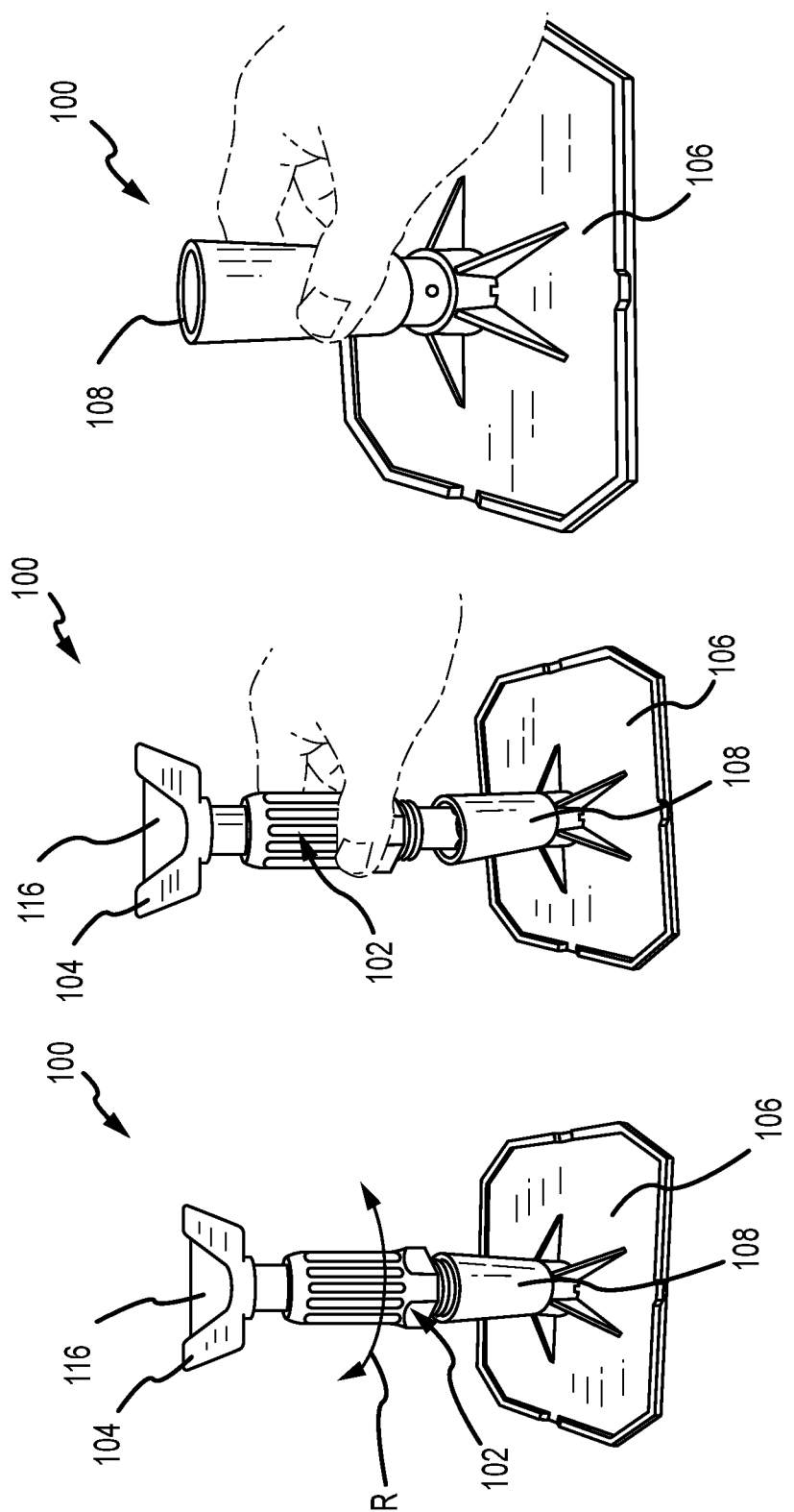

PIPE SUPPORT SYSTEM AND METHOD

CROSS-REFERENCE TO RELATED APPLICATIONS

This application claims priority to and the benefit of U.S. Provisional Patent Application No. 62/586,983, filed on Nov. 16, 2017, under 35 U.S.C. § 119(e), the disclosure of which is hereby incorporated herein by reference in its entirety.

INTRODUCTION

Service piping may be installed in horizontal or substantially horizontal orientations along roofs, floors, and other indoor or outdoor surfaces. Such piping may include hot water (or steam) and chilled water piping for heating and cooling applications, respectively. Other service piping may include domestic hot water and cold water, storm drainage, or sewer piping. Additionally, specialty piping such as chemical and/or gas piping for industrial processes may be installed, or electrical and/or communication conduits for fibers, wires, and cables may be installed. Typically, all of these types of piping are installed above the surface along which they are routed to maintain required clearances, accommodate thermal expansion and contraction, and to increase visibility thereof to avoid damage.

SUMMARY

In one aspect, the technology relates to a pipe support system including: a base including a collar extending therefrom; an extension assembly including: a threaded member including a first end and a second end, wherein the first end includes a leg configured to be received by the collar such that the extension assembly is supported by the base, and the second end includes a tube having exterior threads; and a nut member having corresponding interior threads, wherein the exterior threads and the interior threads both extend for a substantially similar axial length; and a support including: an arm configured to be received within the tube; and a head extending from one end of the arm, and wherein the support rests on the nut member such that upon rotation of the nut member, the head either raises or lowers with respect to the base.

In an example, the head is substantially U-shaped and includes a first end and a second end, wherein the first end includes a curved surface configured to support a substantially round pipe, and the second end includes a substantially flat surface configured to support a strut. In another example, a roller is rotatably supported by the head. In yet another example, the roller is positioned between the first end and the second end. In still another example, the roller is removably disposed within the head. In an example, the roller includes a substantially hollow cylindrical body with an annular groove defined therein. In another example, the leg has a corresponding shape to an inner surface of the collar such that the threaded member is restricted from rotating within the collar. In yet another example, the arm has a corresponding shape to an inner surface of the tube such that the support is restricted from rotating within the threaded member.

In another aspect, the technology relates to a pipe support system including: a base including a collar extending therefrom; an extension assembly at least partially receivable within the collar; and a support coupled to the extension assembly and including a substantially U-shaped head and a roller, wherein the head includes a bottom surface, two opposing sidewalls, a first end, and a second end, the first end including a curved surface configured to support a substantially round pipe, and the second end including a substantially flat surface configured to support a strut, and wherein the roller is supported on the bottom surface between the two opposing sidewalls and the first and second ends, wherein the extension assembly is configured to either raise or lower the support with respect to the base.

In an example, the roller includes a substantially hollow cylindrical body with an annular groove defined therein. In another example, at least one of the first end and the second end includes a detent configured to couple the roller to the head. In yet another example, the flat surface of the second end includes an aperture defined therein for receiving a strut securement element. In still another example, at least one of the two opposing sidewalls includes an aperture defined therein for receiving a pipe securement element. In an example, the extension assembly includes: a threaded member including a first end and a second end, wherein the first end includes a leg configured to be received by the collar such that the extension assembly is supported by the base, and the second end includes a tube having exterior threads; and a nut member having corresponding interior threads, wherein the exterior threads and the interior threads extend for a substantially similar axial length, and wherein the support rests on the nut member. In another example, the support further includes an arm configured to be received at least partially within the collar. In yet another example, a spacer is configured to couple between the base and the extension assembly. In still another example, a mount pad is configured to couple to the collar of the base.

In another aspect, the technology relates to a method of supporting a pipe with a pipe support system including: determining an approximate height that the pipe is to be raised above an underlying surface; assembling the pipe support system in a configuration that corresponds to the determined height, wherein the pipe support system includes at least one of a base, an extension assembly, a support, a roller, and a spacer; positioning the pipe on the support; and actuating the extension assembly to adjust the height of the support.

In an example, the extension assembly includes a threaded member and a nut member, and wherein actuating the extension assembly includes rotating the nut member around the threaded member to either raise or lower the support which is supported on the nut member. In another example, the support includes a substantially U-shaped head having a bottom surface, two opposing sidewalls, a first end, and a second end, and wherein assembling the pipe support system includes inserting the roller into the head and onto the bottom surface between the two opposing sidewalls and the first and second ends.

BRIEF DESCRIPTION OF THE DRAWINGS

There are shown in the drawings examples that are presently preferred, it being understood, however, that the invention is not limited to the precise arrangements and configurations shown.

FIG. 2A is a perspective view of an exemplary base for use with the pipe support system.

FIG. 2B is a side view of the base.

FIG. 2C is a top view of the base.

FIG. 3A is a bottom perspective view of an exemplary spacer for use with the pipe support system.

FIG. 3B is a top perspective view of the spacer.

FIG. 3C is a side view of the spacer.

FIG. 5A is a bottom perspective view of an exemplary nut member for use with the extension assembly.

FIG. 5B is a top perspective view of the nut member.

FIG. 5C is a side view of the nut member.

FIG. 7A is a perspective view of an exemplary roller for use with the pipe support system.

FIG. 7B is a front view of the roller.

FIG. 7C is a side view of the roller.

FIGS. 9A-9C illustrate a method of supporting a pipe with a pipe support system.

DETAILED DESCRIPTION

Figure 1A:
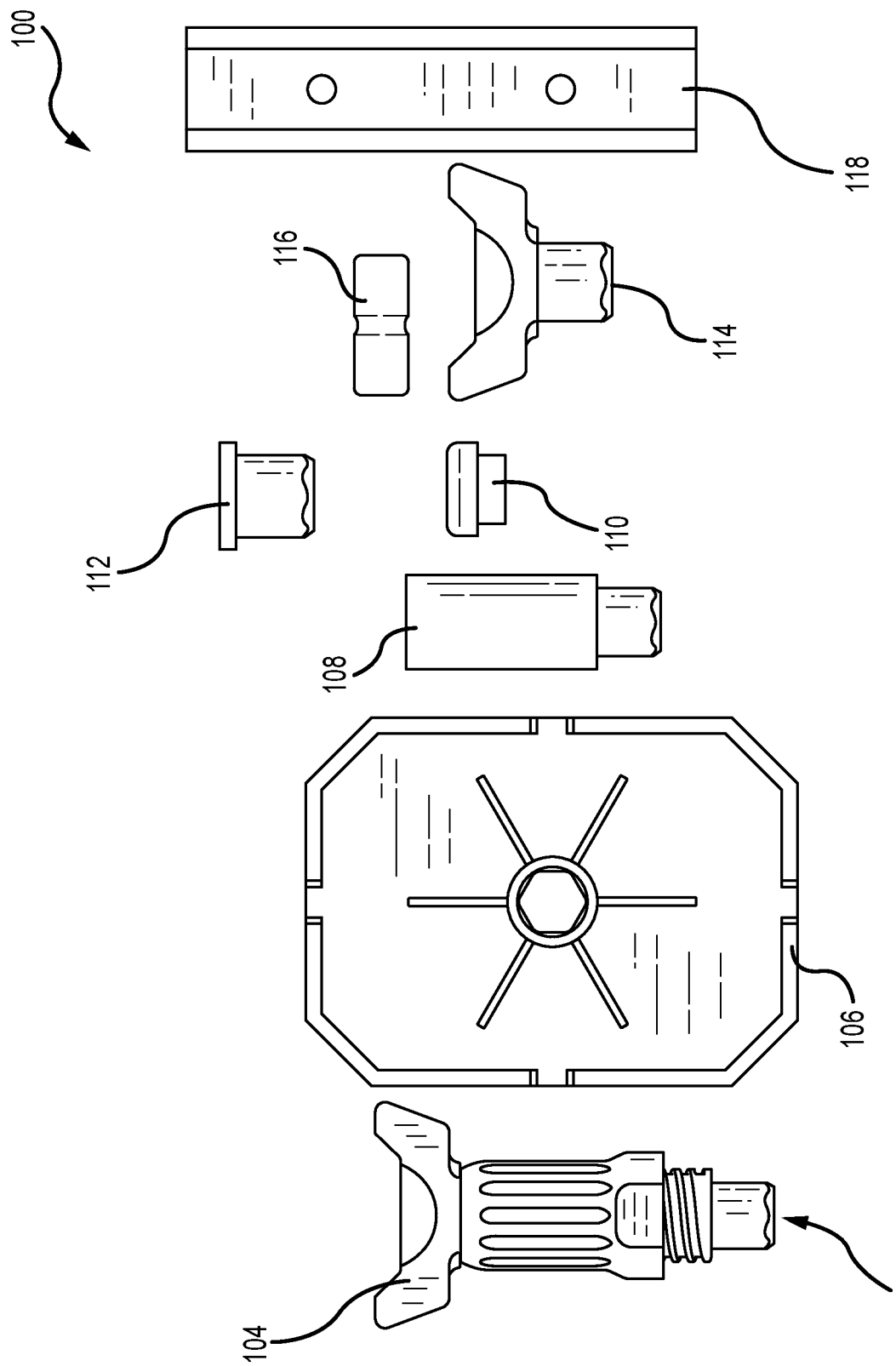
FIG. 1A is a schematic view of an exemplary pipe support system.

FIG. 1A is a schematic view of an exemplary pipe support system 100. The pipe support system 100 includes a number of modular components such that the pipe support system 100 can be adapted to a wide variety of configurations as required or desired. As such, the pipe support system 100 can be field-assembled and adjusted to support pipes installed at different heights above an underlying surface (e.g., a roof surface). Additionally, the pipe support system 100 can be field-assembled and adjusted to accommodate pipes of varying sizes and support requirements (e.g., static support, roller support, and/or a strut support). As noted above, the devices described herein can be used to support various service piping (exposed, insulated, or otherwise encased), conduits, wiring, or other elongate structures. For clarity, however, the specification describes the devices in the context of piping support. In the example, the pipe support system 100 includes one or more of an extension assembly 102, a long support 104, a base 106, a spacer 108, a rubber mount pad 110, a strut mount plug 112, a short support 114, a roller 116, and a strut 118, which are all described below in further detail.

Figure 1B:
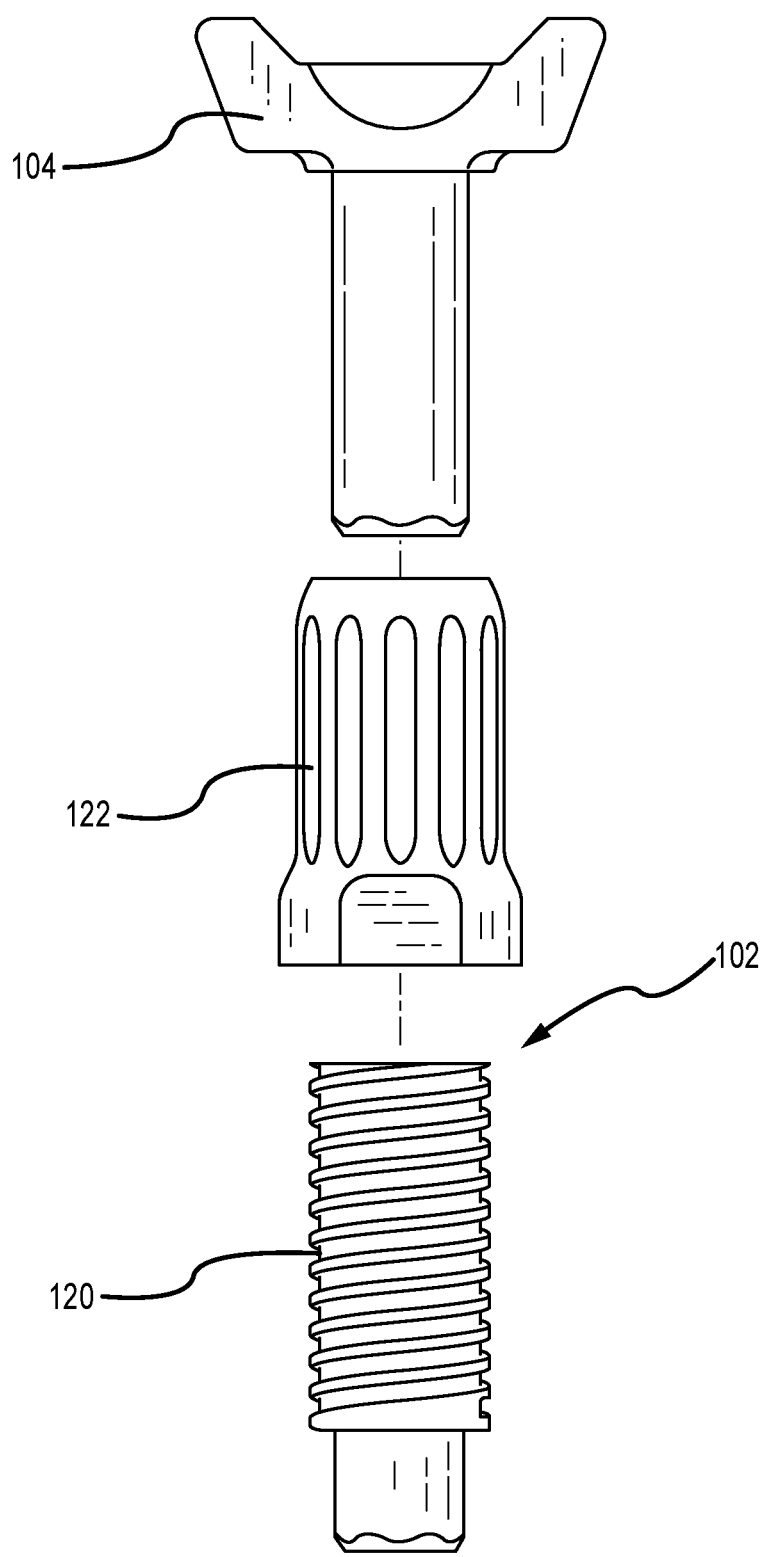
FIG. 1B is a schematic view of an exemplary extension assembly for use with the pipe support system.

FIG. 1B is a schematic view of the extension assembly 102. The extension assembly 102 includes a threaded member 120 and a nut member 122, which together are configured to raise and lower the long support 104 so as to adjust the height of the pipe support system 100 (shown in FIG. 1A) and described below in further detail. In this example, tools are not required to turn the nut member 122, and there is only one nut member 122 to actuate for adjusting the height of the pipe support system. Additionally, there is only one leg to adjust when the roller is coupled to the long support 104, thereby increasing ease of adjustment of the pipe support system.

FIG. 2A is a perspective view of the base 106 for use with the pipe support system 100 (shown in FIG. 1A). FIG. 2B is a side view of the base 106. FIG. 2C is a top view of the base 106. Referring concurrently to FIGS. 2A-2C, the base 106 includes a platform 124 that is shaped and sized to be positioned on an underlying surface and resist overturning loads. In the example, the platform 124 is substantially rectangular and typically will sit on top of the underlying surface. In alternative examples, the platform 124 may include one or more openings (not shown) that allow the pipe support system to be secured to the underlying structure with screws, bolts, or other fasteners. In other examples, an underside of the base 106 may be coated with an adhesive. A collar 126 extends from the platform 124 and is supported by a plurality of circumferentially spaced flanges 128. The collar 126 is configured to receive a portion of the other components (e.g., the extension assembly 102, the spacer 108, the rubber mount pad 110, the strut mount plug 112, and/or the short support 114 (all shown in FIG. 1A)), so as to facilitate assembly of the pipe support system in the desired or required configuration.

The collar 126 has an inner surface 130 that is polygonal in cross-sectional shape so as to prevent the components inserted therein from rotating. However, in other examples, the inner surface 130 may be smooth and circular to allow rotation as required or desired. In the example, the flanges 128 are triangular in shape and slope from the outer sidewall of the collar 126 to the platform 124. In other examples, the flanges 128 may have any other shape, including a polygonal-type shape that has a top edge that extends along the same plane as the top surface of the collar so as to form a larger circumference support surface for large rubber mount pads and/or strut mount plugs.

FIG. 3A is a bottom perspective view of the spacer 108 for use with the pipe support system 100 (shown in FIG. 1A). FIG. 3B is a top perspective view of the spacer 108. FIG. 3C is a side view of the spacer 108. Referring concurrently to FIGS. 3A-3C, the spacer 108 is substantially cylindrical having a bottom end 132 and a top end 134. The bottom end 132 includes a leg that is shaped and sized to be received within the collar 126 (shown in FIGS. 2A-2C) such that the spacer 108 can be supported by the base. In the example, the leg is recessed from an outer surface 135 of the top end 134. An outer surface 136 of the bottom end 132 corresponds to the shape of the collar such that the spacer 108 is prevented from rotating with respect to the collar. The top end 134 is formed as a tube with an inner surface 138 shaped and sized to receive a portion of the other components (e.g., the extension assembly 102, another spacer 108, the rubber mount pad 110, the strut mount plug 112, and/or the short support 114 (all shown in FIG. 1A)), so as to facilitate assembly of the pipe support system in the desired or required configuration.

The inner surface 138 may be polygonal in cross-sectional shape so as to prevent the components inserted therein from rotating. However, in other examples, the inner surface 138 may be smooth and circular to allow rotation as required or desired. In the example, the spacer 108 defines an axial length $L_S$ which is used for extending the height of the pipe support system in various configurations. The length $L_S$ may be any length as required or desired, and the pipe support system described herein may include any number of different length spacers 108.

Figure 4C:
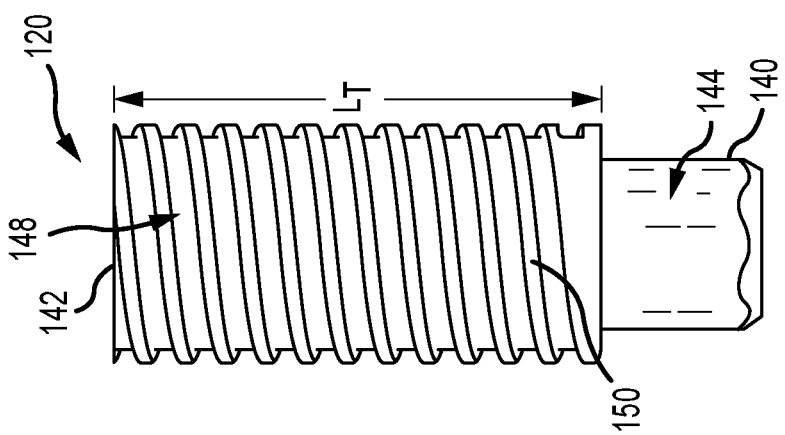
FIG. 4C is a side view of the threaded member.
Figure 4B:
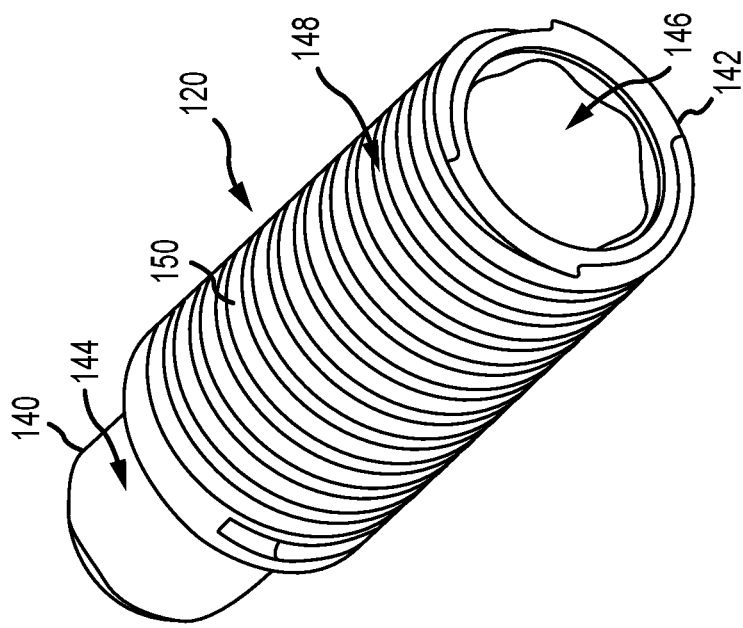
FIG. 4B is a top perspective view of the threaded member.
Figure 4A:
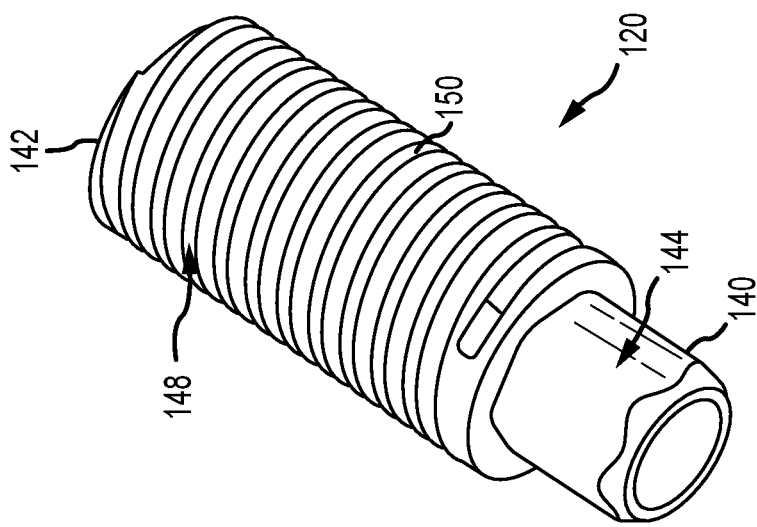
FIG. 4A is a bottom perspective view of an exemplary threaded member for use with the extension assembly.

FIG. 4A is a bottom perspective view of the threaded member 120 for use with the extension assembly 102 (shown in FIG. 1B). FIG. 4B is a top perspective view of the threaded member 120. FIG. 4C is a side view of the threaded member 120. Referring concurrently to FIGS. 4A-4C, the threaded member 120 is substantially cylindrical having a bottom end 140 and a top end 142. The bottom end 140 includes a leg that is shaped and sized to be received within the collar 126 (shown in FIGS. 2A-2C) such that the threaded member 120 can be supported by the base. In other examples, the bottom end 140 may be received within the top end of the spacer 108 (shown in FIGS. 3A-3C) such that the extension assembly is further positioned away from the base. In the example, the leg is recessed from the top end 142. An outer surface 144 of the bottom end 140 corresponds to the shape of the collar/top end of the spacer such that the threaded member 120 is prevented from rotating when coupled to other components.

The top end 142 is formed as a tube with an inner surface 146 shaped and sized to receive a portion of the other components (e.g., the long support 104 (shown in FIG. 1A)), so as to facilitate assembly of the pipe support system in the desired or required configurations. The inner surface 146 may be polygonal in cross-sectional shape so as to prevent the components inserted therein from rotating. For example, a portion of the long support 104 may still extend into the top end 142 when the extension assembly is in an extended configuration so as to prevent the long support from undesirably rotating. However, in other examples, the inner surface 146 may be smooth and circular to allow rotation as required or desired.

An outer surface 148 of the top end 142 also includes exterior treads 150 extending therefrom. The threads 150 define an axial length $L_T$ which is used for determining the extension height of the pipe support system in various configurations. The length $L_T$ may be any length as required or desired, and the longer the length $L_T$ is, the greater the height the extension assembly 102 can extend to.

FIG. 5A is a bottom perspective view of the nut member 122 for use with the extension assembly 102 (shown in FIG. 1B). FIG. 5B is a top perspective view of the nut member 122. FIG. 5C is a side view of the nut member 122. Referring concurrently to FIGS. 5A-5C, the nut member 122 is substantially cylindrical having a bottom end 152 and a top end 154. An inner surface 156 extends from the bottom end 152 to the top end 154 and includes interior threads 158 defined therein. The interior threads 158 correspond to the threads 150 on the threaded member 120 (shown in FIGS. 4A-4C) and enable the nut member 122 to move axially along the threaded member 120 upon rotation of the nut member 122. For example, the interior threads 158 extend approximately along the axial length $L_T$ of the threaded member 120 (shown in FIG. 4C). As such, the nut member 122 may be positioned at any location along the threaded member 120, enabling a full range of height adjustment.

In operation, when the nut member 122 is rotated counter-clockwise, the top end 154 of the nut member 122 extends away from the top end of threaded member 120 so as to extend the axial length of the extension assembly 102, and when the nut member 122 is rotated clockwise, the top end 154 of the nut member 122 retracts towards the top end of the threaded member 120 so as to retract the axial length of the extension assembly 102. As such, this actuation of the extension assembly 102 enables the height of the pipe support system 100 (shown in FIG. 1A) to be raised and lowered as required or desired. In other examples, counter-clockwise rotation of the nut member 122 may retract the axial length of the extension assembly 102 and clockwise rotation of the nut member 122 may extend the axial length of the extension assembly 102.

The outer surface of the bottom end 152 is shaped as a hexagon so as to facilitate use of a tool (e.g., a pipe tool) to rotate the nut member 122. The outer surface of the top end 154 includes a plurality of circumferentially spaced recess such that a grip is formed and to facilitate manual rotation of the nut member 122. Other knurling patterns may also be utilized. Additionally, a top surface 160 of the top end 154 is formed by the nut member 122 so as to support the long support 104 (shown in FIGS. 1A and 1B) as described further below.

Figure 6A:
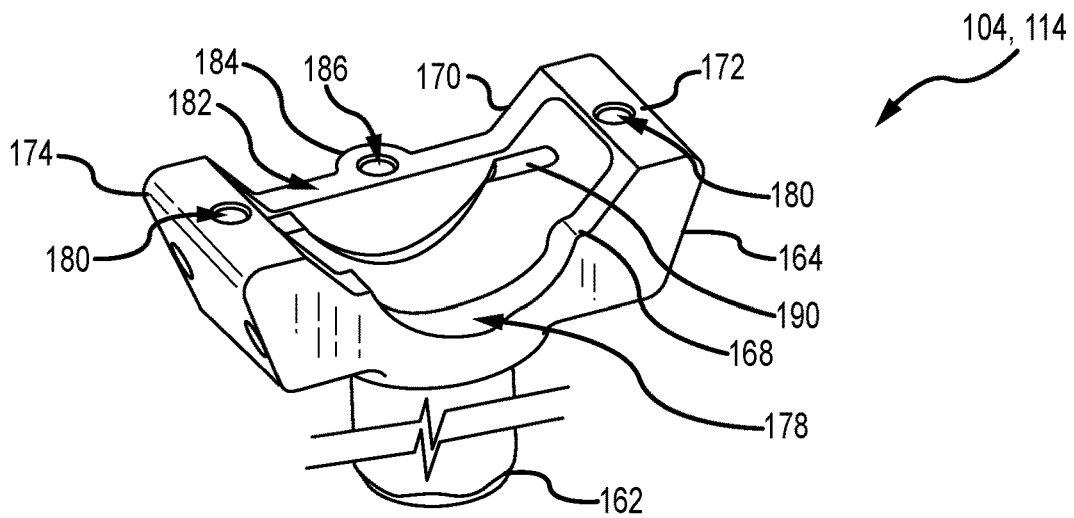
FIG. 6A is a perspective view of an exemplary support for use with the pipe support system.
Figure 6B:
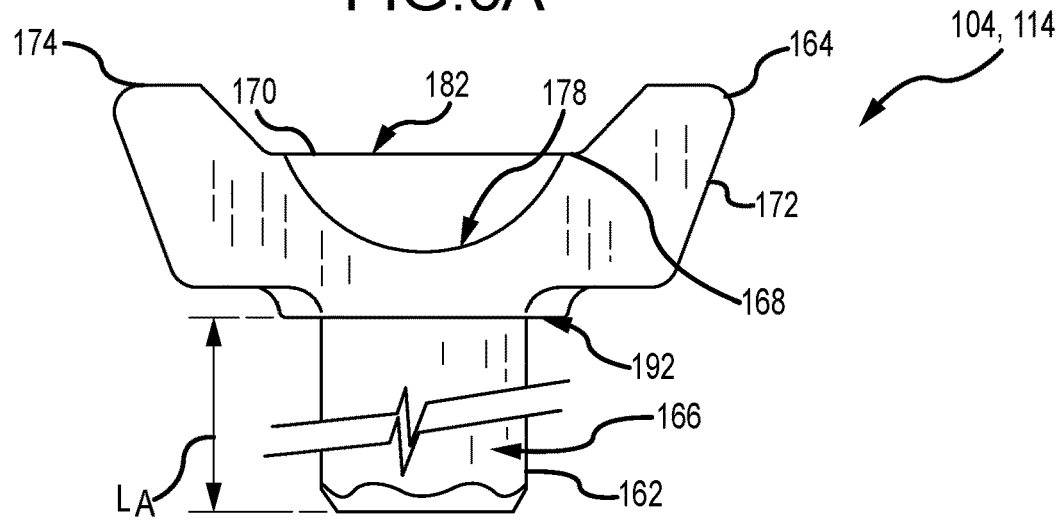
FIG. 6B is a front view of the support.
Figure 6C:
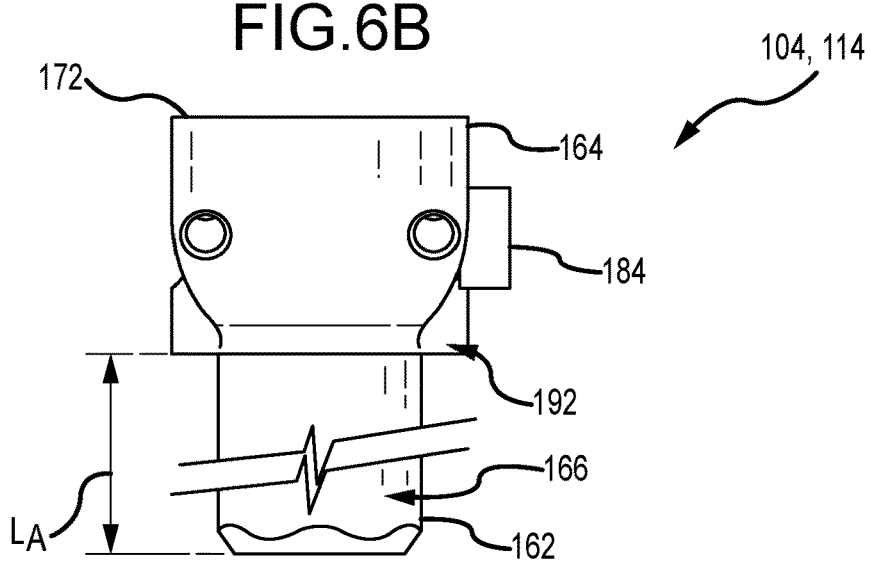
FIG. 6C is a side view of the support.
Figure 6D:
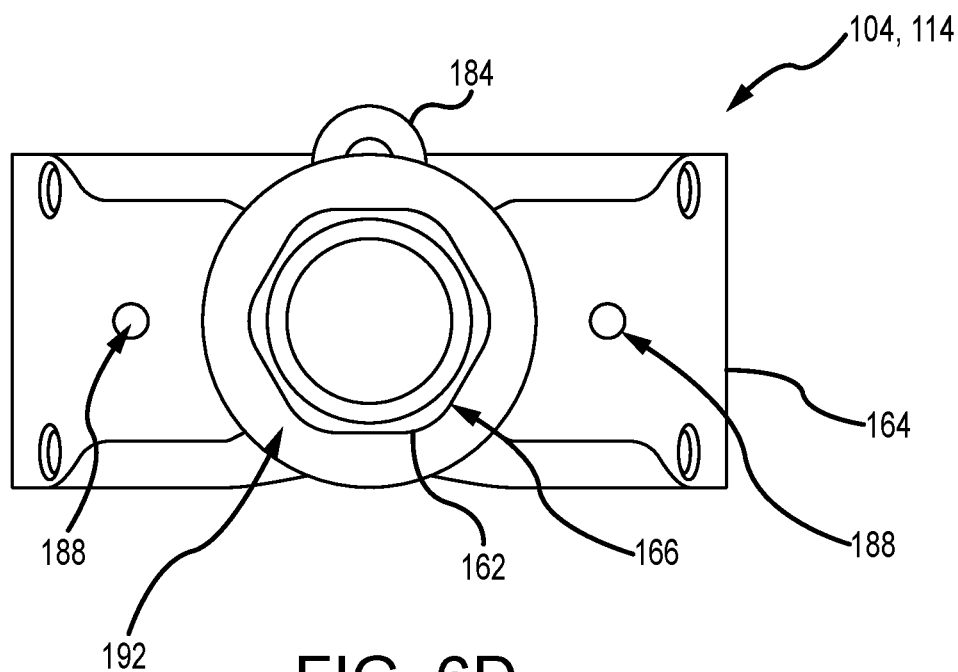
FIG. 6D is a bottom view of the support.
Figure 6E:
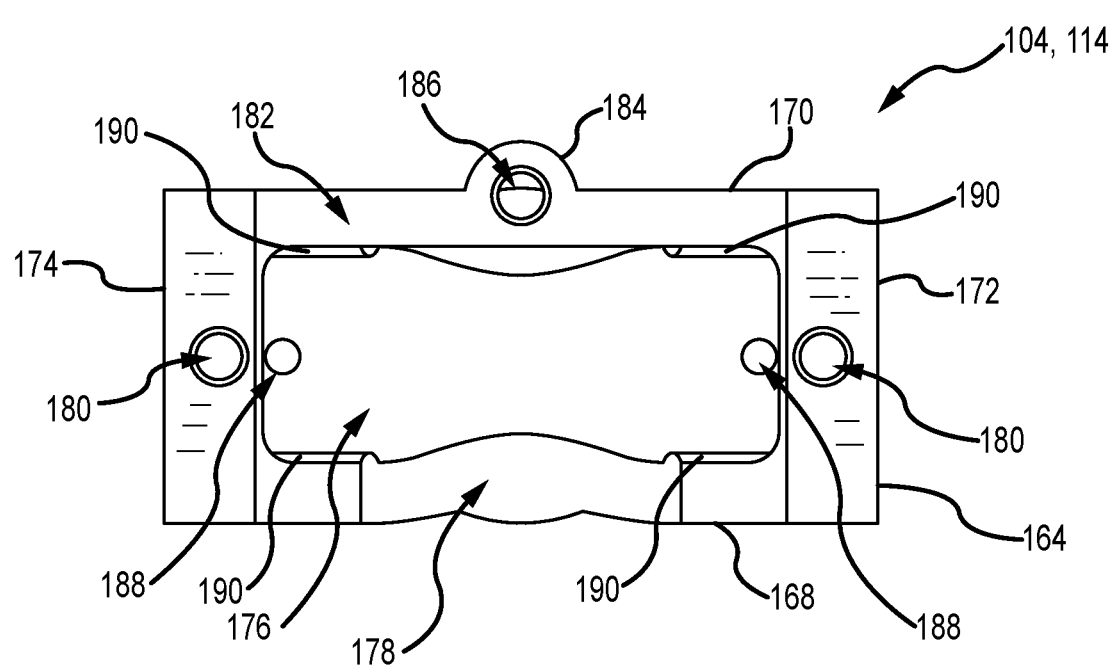
FIG. 6E is a top view of the support.

FIG. 6A is a perspective view of the support 104, 114 for use with the pipe support system 100 (shown in FIG. 1A). FIG. 6B is a front view of the support 104, 114. FIG. 6C is a side view of the support 104, 114. FIG. 6D is a bottom view of the support 104, 114. FIG. 6E is a top view of the support 104, 114. Referring concurrently to FIGS. 6A-6E, the support 104, 114 includes an arm 162 and a head 164 extending from one end of the arm 162. The arm 162 has an axial length LA as required or desired. For example, the length LA of the long support 104 is longer than the length LA of the short support 114, although the head 164 is the same for both and therefore the long support 104 and the short support 114 are described together below.

The arm 162 may be shaped and sized to be received within the collar 126 (shown in FIGS. 2A-2C) such that the short support 114 can be supported by the base. In other examples, the arm 162 may be received within the top end of the spacer 108 (shown in FIGS. 3A-3C) such that the short support 114 is further positioned away from the base. In another example, the arm 162 may be received within the top end of the threaded member 120 (shown in FIGS. 4A-4C) such that the long support 104 is supported by and moveable by the extension assembly. The long support 104 has a longer arm 162 so that when the nut member extends from the threaded member the arm is still at least partially received within the threaded member. An outer surface 166 of the arm 162 corresponds to the shape of the collar/top end of the spacer/top end of the treaded member such that the support 104, 114 is prevented from rotating when coupled to other components.

The head 164 is configured to support the roof equipment, for example, piping, and includes a substantially U-shaped body. The head 164 includes a first end 168, a second end 170, two opposing sidewalls 172, 174, and a bottom surface 176 therebetween. The first end 168 includes a curved surface 178 on the top that is sized and shaped to receive and support a substantially round pipe. For example, the curved surface 178 may be shaped and sized to support approximately a 4 inch round pipe. This pipe dimension need not necessarily be the outer diameter of the pipe, but may also contemplate the outer dimension of any insulation, heat trace tape, metal or plastic shielding, or other components that may increase the effective outer dimension of the pipe. One or more apertures 180 may be defined in the sidewalls 172, 174 for securing the pipe to the head 164 via a pipe securement element, such as a strap, slip-tie, zip-tie, pipe clamp, or the like (not shown). The second end 170 includes a substantially flat surface 182 on the top that is sized and shaped to receive and support the strut 118 (shown in FIG. 1A). For example, the second end 170 may include a projection 184 extending therefrom and with an aperture 186 defined therein to enable the strut to be secured to the head 164 via a strut securement element, such as a screw, strap, bolt, or the like.

In the example, the bottom surface 176 may be curved (e.g., substantially U-shaped) so as to support the roller 116 (shown in FIG. 1A). The roller is positionable between the first end 168, the second end 170, and the sidewalls 172, 174. The bottom surface 176 may also include one or more through-holes 188 that enable water and/or dirt/debris to drain from within the head 164. To restrain the roller within the head 164, each sidewall 172, 174 includes one or more detents 190 extending from the interior surface that facilitates holding the roller in place while still enabling the roller to be able to rotate therein. The detents 190 and the roller may be configured so as to allow the roller to be purposefully removed, but to resist inadvertent dislodgement. The arm 162 extends from an engagement surface 192 defined on the bottom of the head 164. The engagement surface 192 extends around the arm 162 and is configured to rest upon the top surface 160 of the nut member 122 (shown in FIGS. 5A-5C) such that upon actuation of the extension assembly the support 104, 114 either raises or lowers with respect to the base.

FIG. 7A is a perspective view of the roller 116 for use with the pipe support system 100 (shown in FIG. 1A). FIG. 7B is a front view of the roller 116. FIG. 7C is a side view of the roller 116. Referring concurrently to FIGS. 7A-7C, the roller 116 is sized and shaped to be rotatably supported by the head 164 (shown in FIGS. 6A-6E). In the example, the roller 116 has a substantially hollow cylindrical body with an annular groove 194 defined therein. The annular groove 194 is sized and shaped to receive up to a 4 inch diameter pipe and to facilitate positioning the pipe in the center of the pipe support system. Additionally, to either side of the annular groove 194 the roller 116 has a flat roller surface to facilitate roller support of square-shaped pipes. In operation, the roller 116 may be removably coupled to the support to enable another configuration of the pipe support system. The roller 116 is freely rotatable within the support and extends above both the curved surface 178 of the first end and the flat surface 182 of the second end (both shown in FIGS. 6A-6E) so that the pipe can move axially (e.g., due to thermal expansion). By enabling movement of the pipe, the roller decreased stress on the pipe.

In other examples, the roller 116 may be a substantially solid cylindrical body so as to increase the mass of the roller. In another example, the roller 116 may include an outer surface devoid of any grooves to enable an entirely flat roller surface. In yet another example, the roller 116 may have a substantially hollow or solid hour-glass shape so as to facilitate supporting the pipe. In still another example, the roller 116 may have any other shape that enables the roller to function as described herein.

Figure 8A:
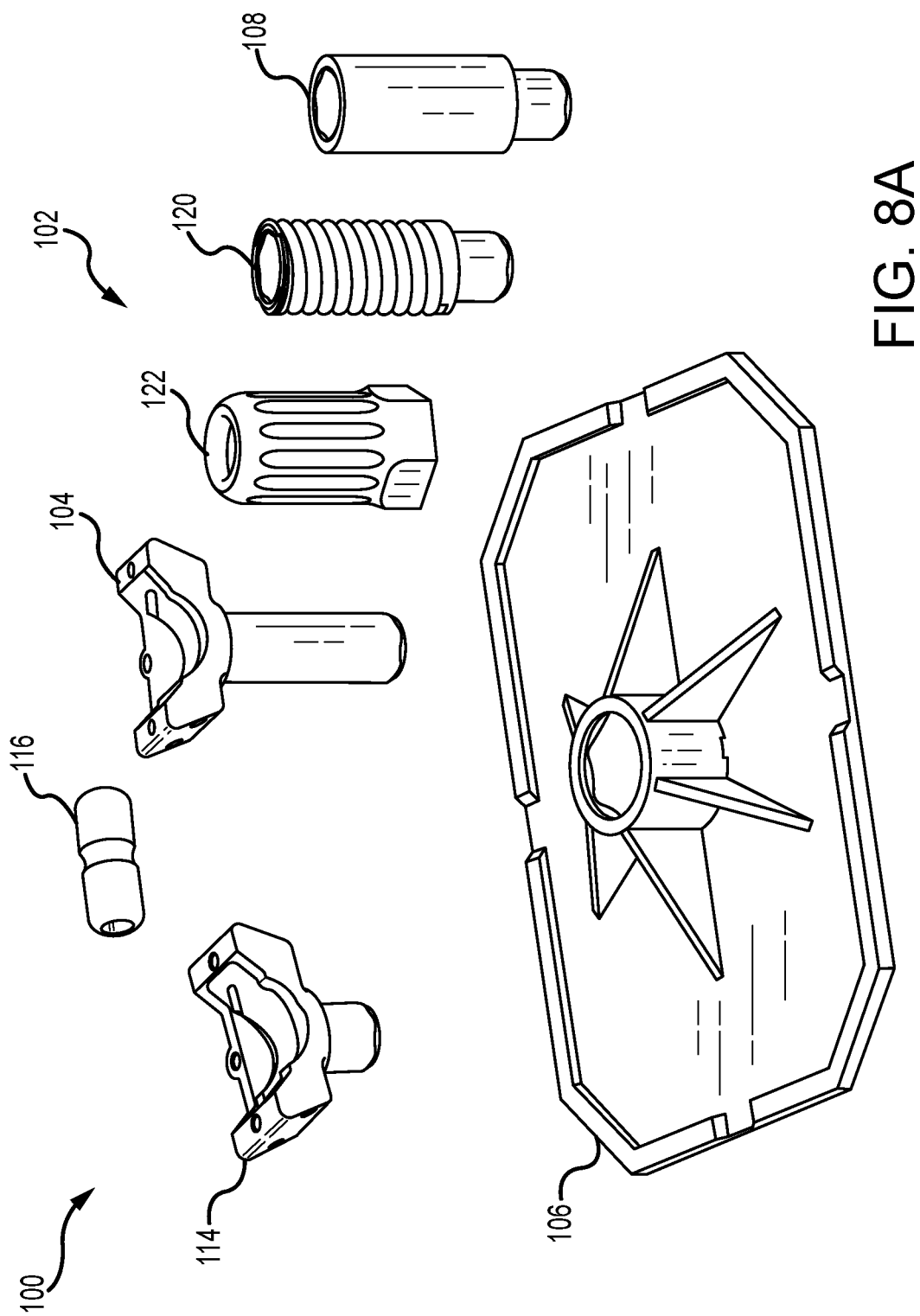
FIG. 8A is a partial perspective view of the pipe support system in a disassembled configuration.

FIG. 8A is a partial perspective view of the pipe support system 100 in a disassembled configuration. The components identified in FIG. 8A are described above and, as such, are not necessarily described further. In the disassembled configuration, the pipe support system 100 is modular, such that any number of components may be used to achieve the required or desired height of the supports 104, 114 and facilitate supporting a piece of equipment on an underlying surface. In use, the equipment is typically supported by one or more pipe support systems 100 spaced apart as required or desired. Additionally, by utilizing a modular pipe support system 100, components may be provided as necessary (e.g., as ordered by a contractor) so as to reduce waste.

Figure 8B:
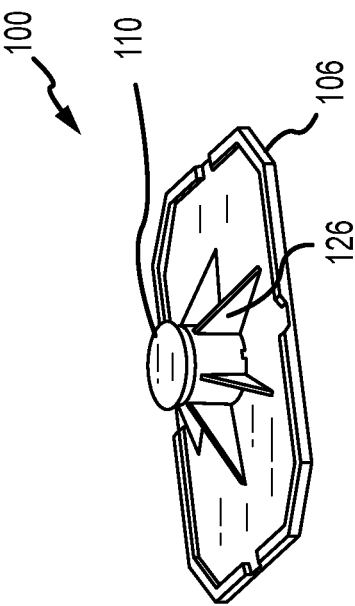
FIGS. 8B-8E are perspective views of exemplary assembled configurations of the pipe support system.
Figure 8D:
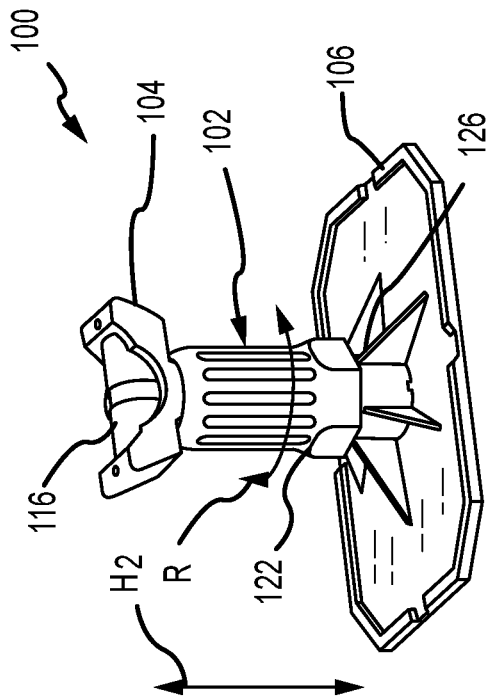
Figure 8C:
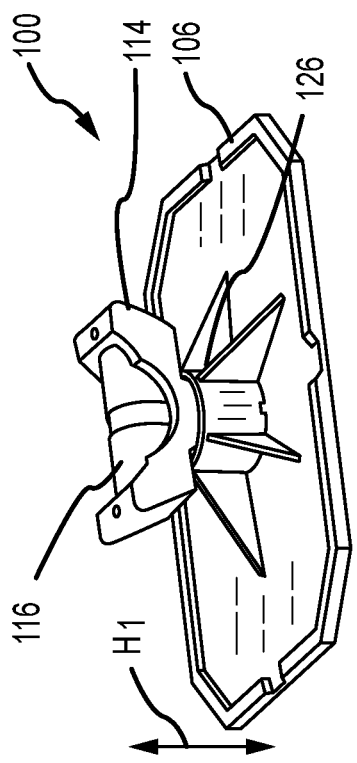
Figure 8E:
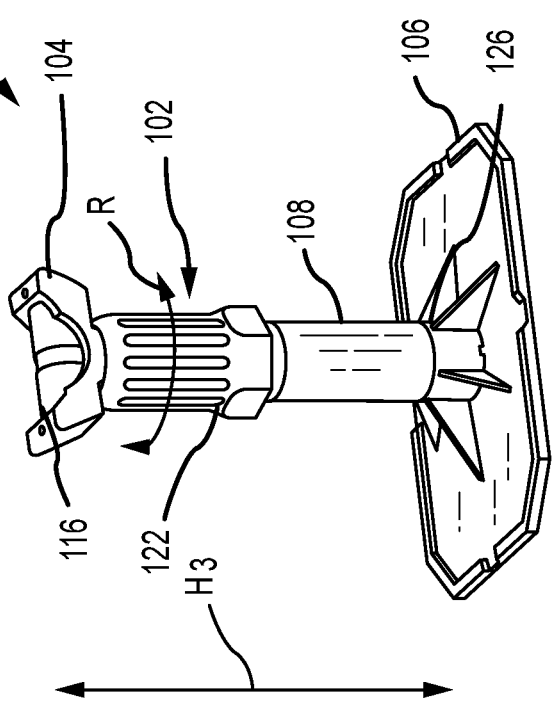

FIGS. 8B-8E are perspective views of exemplary assembled configurations of the pipe support system 100. However, many other configurations are also possible with the components illustrated in FIGS. 1A-1B. The components identified in FIGS. 8B-8E are described above and, as such, are not necessarily described further. FIG. 8B illustrates the base 106 with the rubber mount pad 110 being partially inserted into the collar 126. This configuration may be utilized, for example, as a vibration isolator for a machine (e.g., a HVAC unit) and to support the machine above an underlying surface. In alternative examples, the strut mount plug 112 (shown in FIG. 1A) may be inserted into the collar 126 and may include one or more screw holes so that the strut can be secured to the base. FIG. 8C illustrates the base 106 with the short support 114 coupled to the collar 126. Additionally, the roller 116 may be inserted within the short support 114. This configuration may be utilized to support a pipe a short distance or height $H_1$ from the underlying surface. FIG. 8D illustrates the base 106 with the extension assembly 102 coupled to the collar 126. Additionally, the long support 104 is supported by the extension assembly 102 with the roller 116 inserted therein. In this configuration, the nut member 122 may rotate R so as to raise and/or lower the support 104 from the underlying surface. This configuration may be utilized to support the pipe an intermediate distance or height H2 from the underlying surface. FIG. 8E illustrates the base 106 with the spacer 108 coupled to the collar 126 and between the extension assembly 102 and the base 106. Additionally, the long support 104 is supported by the extension assembly 102 with the roller 116 inserted therein. This configuration may be utilized to support the pipe a high distance or height H3 from the underlying surface.

FIGS. 9A-9C illustrate a method of supporting a pipe (not shown) with the pipe support system 100. In this example, an approximate height that the pipe is to be raised above an underlying surface is determined. Then the pipe support system 100 is assembled in a configuration that approximately corresponds to the determined height. For example, the spacer 108 may be coupled to the base 106 as illustrated in FIG. 9A and then the extension assembly 102 and the support 104 is coupled to the spacer 108 as illustrated in FIG. 9B. The pipe support system 100 is then placed on the underlying surface and the pipe is positioned on the support 104. The extension assembly 102 is then actuated to adjust the height of the support 104 and fine tune the height of the pipe supported thereon as illustrated in FIG. 9C.

In one example, the extension assembly 102 includes a threaded member and a nut member such that actuating the extension assembly 102 includes rotating R the nut member around the threaded member to either raise or lower the support 104 which is supported on the nut member. In another example, the support 104 includes a substantially U-shaped head having a bottom surface, two opposing sidewalls, a first end, and a second end such that assembling the pipe support system 100 includes inserting the roller 116 into the head and onto the bottom surface between the two opposing sidewalls and the first and second ends.

The materials utilized in the pipe support systems described herein may be those typically utilized for building hardware component manufacture. Material selection for most of the components may be based on the proposed weight of the pipe, installation conditions, safety guidelines, etc. Appropriate materials may be selected for the pipe support systems used on particularly heavy or large pipes, as well as on pipes subject to certain environmental conditions (e.g., moisture, corrosive atmospheres, UV exposure, etc.). Aluminum, steel, stainless steel, zinc, or composite materials can be utilized. Injection molded plastics may be particularly useful.

While there have been described herein what are to be considered exemplary and preferred examples of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. A pipe support system comprising:
a base comprising a collar extending therefrom;
an extension assembly comprising:
a threaded member comprising a first end and a second end, wherein the first end comprises a leg configured to be received by the collar such that the extension assembly is supported by the base, and the second end comprises a tube having exterior threads; and
a nut member having corresponding interior threads, wherein the exterior threads and the interior threads both extend for a substantially similar axial length; and
a support comprising:
an arm configured to be received within the tube; and
a head extending from one end of the arm, wherein the head is substantially U-shaped and comprises a first end and a second end, wherein the first end comprises a curved surface configured to support a substantially round pipe, and the second end comprises a substantially flat surface configured to support a strut, and
wherein the support rests on the nut member such that upon rotation of the nut member, the head either raises or lowers with respect to the base.

2. The pipe support system of claim 1, further comprising a roller rotatably supported by the head.

3. The pipe support system of claim 2, wherein the roller is positioned between the first end and the second end.

4. The pipe support system of claim 2, wherein the roller is removably disposed within the head.

5. The pipe support system of claim 2, wherein the roller comprises a substantially hollow cylindrical body with an annular groove defined therein.

6. The pipe support system of claim 1, wherein the leg has a corresponding shape to an inner surface of the collar such that the threaded member is restricted from rotating within the collar.

7. The pipe support system of claim 1, wherein the arm has a corresponding shape to an inner surface of the tube such that the support is restricted from rotating within the threaded member.

8. A pipe support system comprising:
a base comprising a collar extending therefrom;
an extension assembly at least partially receivable within the collar; and
a support coupled to the extension assembly and comprising a substantially U-shaped head and a roller, wherein the head comprises a bottom surface, two opposing sidewalls, a first end, and a second end, the first end comprising a curved surface configured to support a substantially round pipe, and the second end comprising a substantially flat surface configured to support a strut, and wherein the roller is supported on the bottom surface between the two opposing sidewalls and the first and second ends,
wherein the extension assembly is configured to either raise or lower the support with respect to the base.

9. The pipe support system of claim 8, wherein the roller comprises a substantially hollow cylindrical body with an annular groove defined therein.

10. The pipe support system of claim 8, wherein at least one of the first end and the second end comprises a detent configured to couple the roller to the head.

11. The pipe support system of claim 8, wherein the flat surface of the second end comprises an aperture defined therein for receiving a strut securement element.

12. The pipe support system of claim 8, wherein at least one of the two opposing sidewalls comprises an aperture defined therein for receiving a pipe securement element.

13. The pipe support system of claim 8, wherein the extension assembly comprises:
a threaded member comprising a first end and a second end, wherein the first end comprises a leg configured to be received by the collar such that the extension assembly is supported by the base, and the second end comprises a tube having exterior threads; and
a nut member having corresponding interior threads, wherein the exterior threads and the interior threads extend for a substantially similar axial length, and wherein the support rests on the nut member.

14. The pipe support system of claim 8, wherein the support further comprises an arm configured to be received at least partially within the collar.

15. The pipe support system of claim 8, further comprising a spacer configured to couple between the base and the extension assembly.

16. The pipe support system of claim 8, further comprising a mount pad configured to couple to the collar of the base.

17. A method of supporting a pipe with a pipe support system comprising:
determining an approximate height that the pipe is to be raised above an underlying surface;
assembling the pipe support system in a configuration that corresponds to the approximate height, wherein the pipe support system includes a base, an extension assembly, a support, and a roller, and wherein the support includes a substantially U-shaped head having a bottom surface, two opposing sidewalls, a first end, and a second end, the first end including a curved surface configured to support the pipe, and the second end including a substantially flat surface configured to support a strut;
inserting the roller into the head between the two opposing sidewalls and the first and second ends;
positioning the pipe on the support; and
actuating the extension assembly to adjust a height of the support.

18. The method of claim 17, wherein the extension assembly includes a threaded member and a nut member, and wherein actuating the extension assembly comprises rotating the nut member around the threaded member to either raise or lower the support which is supported on the nut member.

* * * * *